June 2, 1925.                J. R. COCHRANE                1,539,937
                              TESTING DEVICE
                            Filed Nov. 14, 1923
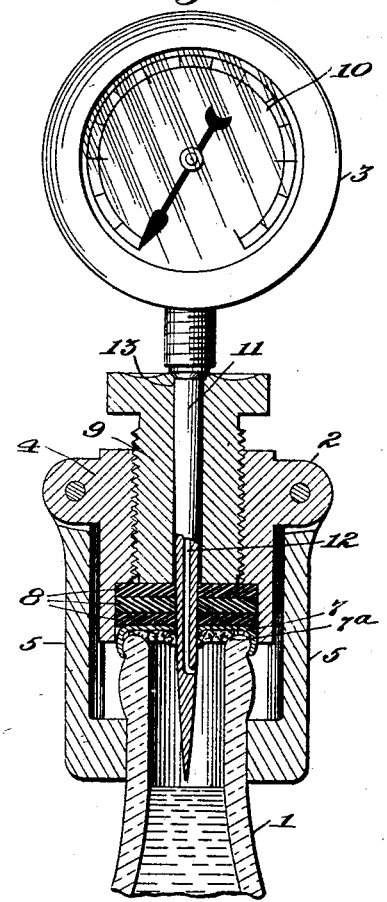
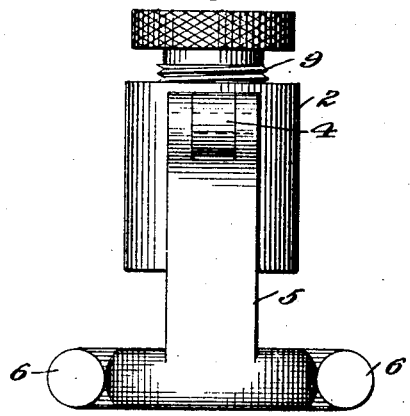
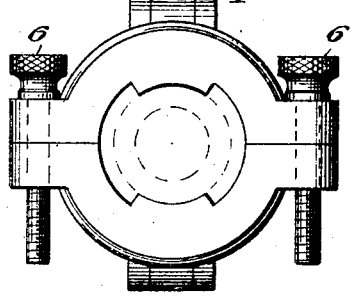
Inventor:
James R. Cochrane
By Wm. L. Symons
his Att'y.

Patented June 2, 1925.

1,539,937

UNITED STATES PATENT OFFICE.

JAMES R. COCHRANE, OF FRANKLIN, PENNSYLVANIA, ASSIGNOR TO WILLIAM L. SYMONS, OF WASHINGTON, DISTRICT OF COLUMBIA.

TESTING DEVICE.

Application filed November 14, 1923. Serial No. 674,689.

*To all whom it may concern:*

Be it known that I, JAMES R. COCHRANE, a citizen of Great Britain, residing at Franklin, in the county of Venango and State of Pennsylvania, have invented certain new and useful Improvements in Testing Devices, of which the following is a specification.

This invention relates to a device to be used to test the pressure in sealed receptacles such as bottles of ginger ale and bottles of similar beverages.

The objects of the invention are the construction of a device which may be easily and securely operated, which will be efficient and which may be easily repaired.

With these and further objects in view, an embodiment of my invention is disclosed in the accompanying drawings in which:

Figure 1 is a vertical section through the device as used showing the top of a conventional bottle;

Figure 2 is a side elevation with the gauge omitted;

Figure 3 is a bottom plan view.

My device is shown as used on a conventional bottle 1 and comprises, generally speaking, a clamping part 2 and a gauge part 3. The clamping part consists of a body 4 having two arms 5 hinged thereto. These arms have the inner lower faces thereof shaped to firmly clasp the neck of a bottle. The arms are held securely in position by clamping screws 6. The body of the device is placed directly above the cap or cover of the bottle which in the bottle illustrated may consist of a metal piece 7 having directly beneath it the usual cork or other resilient material 7ª. In the lower part of the opening in the body of the device are placed layers of resilient material such as layers of rubber 8. A plug 9 is screwthreaded into the top of the body. The gauge 10 is connected with a pointed tube 11 having an opening 12 from the gauge to a point adjacent the pointed end of the tube.

The operation of my device will be readily understood. The clamping arms are placed in position around the top of the bottle and firmly attached thereto by tightening the screws connecting the two arms. The plug 9 is then screwed downward compressing the resilient material against the top of the cap. The pointed tube is then inserted in the opening 13 in the plug. By pressure on the gauge the point of the tube is pushed through the rubber and the cap until the lower opening in the tube is in the top of the bottle. As the gas cannot escape except through the tube leading to the gauge, the rubber having securely sealed the opening made by the pointed tube, the pressure will be immediately and accurately indicated by the gauge.

It will be obvious that the resilient material when it has been perforated repeatedly may be replaced with new pieces thereof. The pressure which may be placed on the rubber pieces due to the low pitch of the threads on the plug is sufficient, until the rubber has been repeatedly pierced, to seal perfectly the point of contact of the rubber and the cap and to prevent any escape of gas around the hollow tube, thus producing a perfect pressure registering device.

While I have shown my device applied to a bottle having a round tapering neck it is evident the device may be used on bottles of various shapes.

Having described my invention what I claim and desire to protect by Letters Patent is:

1. In a pressure testing device adapted to test the pressure in a receptacle having a top with closing means such as a cap, means to grasp said receptacle, means to press said grasping means against said top, a gauge and means connected with said gauge to perforate said cap whereby the pressure in said receptacle will be measured by said gauge.

2. In a pressure testing device adapted to test the pressure in a receptacle having a top with closing means such as a cap, means to grasp said receptacle, means to press said grasping means against said top including a screw-threaded plug, a gauge, and means connected with said gauge to perforate said cap whereby the pressure in said receptacle will be measured by said gauge.

3. In a pressure testing device adapted to test the pressure in a receptacle having a top with closing means such as a cap, means to grasp said top, means to press said grasping means against said top including a screw-threaded plug, a gauge, and means connected with said gauge to perforate said cap through an opening in said screwthreaded plug whereby the pressure in said receptacle will be measured by said gauge.

4. In a pressure testing device adapted to test the pressure in a receptacle having a top with closing means such as a cap, means to grasp said top, means to press said grasping means against said top including hinged arms, a gauge, and means connected with said gauge to perforate said cap through an opening in said screw-threaded plug whereby the pressure in said receptacle will be measured by said gauge.

5. In a pressure testing device adapted to test the pressure in a receptacle having a top with closing means such as a cap, means to grasp said top, means to press said grasping means against said top including hinged arms, means to clamp said arms to the top of said receptacle, a gauge, and means connected with said gauge to perforate said cap through an opening in said screw-threaded plug whereby the pressure in said receptacle will be measured by said gauge.

6. In a pressure testing device adapted to test the pressure in a receptacle having a top with closing means such as a cap, means to grasp said top, means to press said grasping means against said top including hinged arms, means to clamp said arms to said receptacle, and a screw-threaded plug having an opening therein, a gauge, and means connected with said gauge to perforate said cap by inserting said perforating means through the opening in said plug and into the said receptacle whereby the pressure in said receptacle will be measured by said gauge.

7. In a pressure testing device adapted to test the pressure in a receptacle having a top with closing means such as a cap, means to grasp said receptacle, means to press said grasping means against said top including a resilient pierceable material placed against said cap, a gauge, and means connected with said gauge to perforate said material and said cap whereby the pressure in said receptacle will be measured by said gauge.

In testimony whereof I affix my signature.

JAMES R. COCHRANE.